3,019,110
HEAT TREATMENT OF HOMOGENIZED MATERIALS

Henry W. Bevarly, Louisville, Ky., assignor to Chemetron Corporation, Chicago, Ill., a corporation of Delaware
No Drawing. Filed Oct. 28, 1959, Ser. No. 849,179
4 Claims. (Cl. 99—122)

This invention relates to a method for continuously mixing and heat treating liquid or semi-plastic products which are in the form of suspensions, such as margarine, ice cream, peanut butter, and marshmallow for rapid and efficient heat exchange.

In the manufacture of margarine, ice cream, peanut butter, marshmallow and related work-sensitive suspensions, the texture of which depends upon the manipulation and heat treatment that they have received, it is important that such materials be rapidly and efficiently cooled during or after the homogenization of the ingredients thereof at an appropriate temperature. The stability of the homogenized suspensions and the texture, flavor, density and other physical characteristics of the final product depend in large part upon the physical treatment which they have received. For instance, margarine is commonly produced by a continuous process of warming and emulsifying the ingredients at a temperature above 100° F. and then cooling the resultant product rapidly to a temperature below about 60° F. and finally subjecting the cooled product to mild working to impart improved softness and plasticity to the margarine. Likewise, peanut butter, ice cream and other suspended or emulsified food products are made by admixing and homogenizing the ingredients at ambient or higher temperatures and then cooling and homogenizing the products to impart a permanent softness and plasticity to them and to render them substantially stable against separation into two or more phases.

It is an object of this invention to provide a method of heat-treating and homogenizing liquid and semi-plastic materials. It is another object to provide a method of homogenizing and cooling suspensions of solids, liquid and gases in a liquid phase to provide improved products.

I have discovered that margarine, ice cream, peanut butter, and other liquid or semi-plastic food products which are work-sensitive may be rapidly and efficiently kneaded, agitated and homogenized and at the same time rapidly chilled to stabilized products having highly desirable characteristics by passing the ingredients of such materials through a tubular heat exchanger having an eccentric rotating mutator shaft journalled for rotation within and parallel to the axis of the tubular heat exchanger and fitted with scraper blades which pivot inwardly toward and outwardly away from the shaft with each revolution of the shaft. The scraper blades by moving inwardly and outwardly exert pressure on and provide mechanical kneading of the material being treated and have a very beneficial effect on the formation of emulsions and similar colloidal suspensions, whereby efficient mixing of the ingredients, kneading of the mixture and cooling the same at a rapid rate are achieved, whereby superior margarine, ice cream, peanut butter, marshmallow and similar products are prepared.

A preferred embodiment of such tubular heat exchanger is shown in my copending applications, Serial No. 828,414, filed July 20, 1959, and Serial No. 743,660, filed June 23, 1958, now Patent No. 2,980,539. Generally, the tubular heat exchanger comprises a cylindrical heat exchange surface which is surrounded with an outer jacket through which is passed a cooling medium such as cold water, cold brine or liquid ammonia. Within the heat exchanger and parallel to the axis thereof is disposed a cylindrical mutator shaft, the diameter of which is about 1/3 to 2/3 the diameter of the tubular heat exchanger. The tubular heat exchange surface and the mutator shaft define an annular or approximately annular space wherein the material is agitated and cooled. The axis of said mutator shaft, while parallel to that of the tubular heat exchanger, is offset or eccentric so that the shaft is nearer the heat exchange surface in one transverse section than in other sections. Affixed to the surface of the mutator shaft are groups of blades which are pivotably connected thereto. The leading edges of the blades are parallel to the axis of the shaft and the blades can pivot inwardly toward the surface of the shaft and outwardly toward the tubular heat exchange surface. The length of the blades (that is, their dimension parallel to axis of the shaft) may vary from about 6% to about 50% the longitudinal length of the tubular heat exchange surface. The blades are arranged in groups around the shaft, generally two, three or four blades spaced uniformly apart around the circumference of the shaft at 180°, 120° or 90° apart. The next group of blades on the shaft is generally in a staggered relation to the first group and the blades in the group are also uniformly spaced apart. The blades of one group overlap the blades of the adjacent group by a relatively small amount such as 1/4 inch to 1 inch, although they may overlap to as much as about 1/3 the length of the blades. The number of blades may vary from about 4 to about 48 depending on the size thereof and their arrangement. The ends of the tubular heat exchanger are closed with suitable end plates having conduit members through which the materials to be treated pass into and out of the heat exchanger by means of a pump or the like. The mutator shaft is journalled for rotation in bearings attached to said end plates and is driven by a motor or the like.

The tubular heat exchange surface can be cylindrical or it can be elliptical in cross section. If it is cylindrical the axis of the mutator shaft is offset from the axis of the cylindrical heat exchanger. If the latter is elliptical in cross section then the axis of the mutator shaft can be located within the focal points or foci of the elliptical cross section and should be parallel to the surface of the heat exchanger. In both arrangements the surface of the mutator shaft will be nearer to the heat exchange surface in some directions than in others. Therefore, the scraper blades pivotably attached to the shaft will move toward and away from the shaft as the latter rotates. These features are described fully in my copending application Serial No. 828,414.

The leading edges of the blades can be bevelled so as to provide a knife-like edge for scraping the surface of the tubular heat exchanger free from the material undergoing treatment and heat transfer. The rotation of the shaft is such that the sharp edges of the blades are continuously moving in the direction of the rotation of the shaft. Centrifugal force and the resistance of the material being processed causes the sharpened ends of the blades to be continuously in contact with the inside surface of the heat exchange tube and because of the eccentric mounting of the shaft with respect to the tube heat exchange, the ends of the blades continuously move inwardly and outwardly with respect to the surface of the shaft. Thus, it will be seen that the blade at the smallest section of the annulus is closely adjacent to the surface of the shaft while the blade on the opposite side of the shaft diverges considerably from the surface of the shaft. The blades are preferably arranged in a staggered pattern about the surface of the shaft and the rows of blades are not continuous but the individual blades are spaced apart slightly less than the length of the blade. Thus, the blades scrape the full inner surface of the tubular heat exchange surface even though spaces are provided between adjacent blades in a single row. The blade arrangement, namely alternate staggered rows, produces a superior mixing action for as the shaft rotates, each blade acts somewhat like a plow forcing material ahead of it. Material in turn resists the action of the blade and tends to split into the two streams, a portion of the material passing on either side of the individual blade to be substantially caught ahead of the falling blade where the action is repeated. This continual splitting of the mass augmented by the oscillating action of the blades which produces a kneading effect has been found not only to produce very intense mixing but also to improve overall heat transfer efficiency.

The ingredients of margarine, ice cream, peanut butter, as well as other food products when passed through the annular space between the shaft and the tubular heat exchange surface, are subjected to the rapid and continuous plowing, kneading and mixing action of the rotating blades within said annular space. At the same time heat is removed from the material within the annular space through the heat exchanger wall by the cooling medium. In a few seconds the ingredients introduced into the annular space are thoroughly admixed and homogenized as well as cooled, and pass out of the heat exchanger in a stabilized, homogenized condition suitable for use as food products.

The degree of eccentricity of the annular space between the shaft and the tubular heat exchange surface is critical and if the full advantage of the invention is to be realized it must be such that the distance from the mutator shaft surface to the inner wall of the tubular heat exchange surface in the zone of greatest distance must be at least 1.5 times the distance measured in the zone of minimum distance. Eccentricities less than this amount apparently do not have sufficient mass rotation inhibiting effect and do not cause sufficient oscillation of the blades with concomitant kneading effect. In most instances the maximum ratio of the maximum shaft to wall distance to minimum shaft to wall distance will be less than 5 to 1.

A novel feature of this invention is the mixing and agitation of suspensions wherein an oil, gas or solid phase is suspended in another phase in a heat exchange relation to a cooling surface under conditions such that the materials are subjected to mechanically induced intermittent pressure pulsations while at the same time subjected to rotational movement and to longitudinal movement through the heat exchanger. The materials are rotated within the cylindrical cooling device while moved longitudinally in a backwards and forwards motion with the result that the particles pass in a zig-zag series of spiral paths through the cooling device, thereby becoming intimately suspended in the mixture and at the same time chilled to appropriate temperature. By plotting vector diagrams of the forces exerted on a representative particle at various positions within the heat exchanger when subjected to rotation by blades attached to a cylindrical shaft eccentrically located within said heat exchanger, and by determining the velocity of representative particles of such positions, it has been found that the longitudinal velocity varies with the position of the particle within the annular space between the shaft and the heat exchange surface. It has thus been found that a representative particle of material on entering the heat exchanger and agitator is subjected to a strong rotational force created by the revolving blades on the rotating shaft. As the material rotates toward the small section of the annulus between the shaft and the heat exchange surface, its velocity increases due to increased pressure as the material is compressed into a smaller volume. Some of the material moves longitudinally away from the high pressure zone to lower pressure zones; such material moves both forward and backward longitudinally. The overall movement is forward through the heat exchanger because the material is injected into the equipment under pressure which produces a greater overall forward motion than reverse motion. Some material escapes around the moving blades and actually moves counter to the rotation of the shaft and blades. Other material, by reason of the increase in pressure thereon, moves with increasing velocity toward and through the smallest section of the annulus and escapes into a zone of lower pressure where the distance between the central shaft and the heat exchange surface increases, thereby providing a greater volume where the material is subjected to lower pressure. The revolving blades move the material in the latter lower pressure zone toward the section of the annulus where the distance between the shaft and the heat exchange surface is greatest. During the movement toward the largest section of the annulus the pressure on the material decreases and the material moves in a substantially rotating path, some of the material, of course, spills over the edges and ends of the revolving blades and is picked up by following blades. After the largest section of the annulus is passed the material moves in a rotating direction toward the smallest part of the annulus, with increasing pressure being exerted thereon. The cycle is repeated many times as the material moves longitudinally through the heat exchanger and agitator to the exit.

In one rotation around the shaft of the heat exchanger, a representative particle of material will be subjected to the rotational force of a large number of revolving blades. It will also be subjected to increasing pressures followed by decreasing pressures as the material escapes from the high pressure zone, as by moving forward or backward longitudinally or as by escaping around the moving blades in a direction counter to the direction of the blades and shaft to reach a lower pressure zone behind said blades. Further, a representative particle will move inwardly and outwardly from the rotating shaft as pressures and velocities vary. The zone of highest velocity and pressure is near the leading edges of the blades which are farthest removed from the shaft. Material in such zones may move inwardly toward the shaft by reason of the high pressure in such zones and the lower pressure near the shaft.

Taking into consideration all of the various pressures and forces applied to the material at various positions within the annular space or annulus between the shaft and the cooling surface of the heat exchanger, and recognizing that the materials to which this invention is applied are highly viscous suspensions, it is seen that a representative particle of the material, after it is injected into the heat exchanger, will follow an irregular path which generally will be a slow irregular spiral about the rotating shaft with numerous forward and reverse motions longitudinal of the heat exchanger and with numerous inward and outward motions transverse of the heat exchanger, with accelerations and decelerations in both rotational and longitudinal velocity as the material approaches and recedes from the section of the annulus where the distance between the shaft and the surrounding heat exchange surface is near the minimum. Each application of rotational force by a rotating blade attached to the revolving shaft to the material in the heat exchanger will cause the material to move in the direction of the blade for a short distance before the material moves backward or forward longitudinally or moves counter to the direction of the blade. The same material is picked up by another revolving blade and the cycle of motions is repeated. When the blade is approaching the small section of the annulus the material moves with higher velocity than when the blade is approaching the large part of the annulus. This causes material to move farther along the spiral path per blade action at some parts of the path than at others. The result is that the path of the material is a very irregular spiral made up of zig-zag motions both forward and backward longitudinally and inward and outward from the shaft, and with greater and lesser rotational motion depending on the position in the heat exchanger.

The maximum rotational force is applied to particles in the area of the annulus where the distance between the central shaft and the heat exchange surface is a minimum and the rotational force decreases as the material moves toward the area where the distance is a maximum between the central shaft and the heat exchange surface. Varying rotational forces applied to particles within the annular space subject the material to varying velocity at various locations within the annulus. This causes particles to move in a roughly helical manner throughout the annulus as the blades move particles from that section of the annulus having the greatest distance between the shaft and the heat exchange surface towards sections which have less distance between the shaft and the heat exchange surface.

The overall path is essentially a slow helical path repeated many times as the particle passes through the annular space. As the central shaft rotates at a rate of 50 to 400 r.p.m., the blades move inwardly and outwardly from the central shaft imparting a kneading effect to material in the annular space and forcing such material in a reciprocating motion longitudinally of the tubular heat exchanger so that the material passes in a zig-zag motion imposed upon a helical or spiral motion. The average particle of material in the annulus is subjected to several hundred kneading and rotational forces per minute.

The invention is further disclosed by the following examples which illustrate the production of food products in accordance with the invention. It will be understood by those skilled in the art that numerous modifications in materials, conditions and equipment can be made within the scope of this invention and the examples are not to be construed as limitations thereof.

EXAMPLE 1

*Production of margarine*

A conventional margarine stock was used, having the following approximate composition:

| | Parts |
|---|---|
| Selectively hydrogenated vegetable oils | 2600 |
| Skimmed milk | 530 |
| Salt | 100 |
| Emulsifier (40-50% mono- and diglycerides) | 5 |
| Lecithin | 5 |
| Yellow food coloring | 2 |

The margarine feed stock was prepared and maintained at approximately 94–96° F. in a jacketed feet tank. Margarine was pumped at a rate of 5240 lbs. per hour through a precooler where the temperature thereof was dropped from approximately 94–96° F. to 52–54° F., then passed from the precooler into a cylindrical heat exchanger at a pressure of 160–175 p.s.i.g., said heat exchanger being approximately 6 inches in diameter and 48 inches long (as described in my copending application Serial No. 828,414) and having a cooling surface of 5.9 square feet. Journalled for rotation within the cylindrical heat exchanger was a cylindrical shaft 3¾ inches in diameter on an axis displaced ¼ inch off center from the axis of the cylindrical heat exchanger. Pivotably attached to the shaft were blades 5½ inches long in staggered arrangement with four blades in each group 90° apart and adjacent blades overlapping each other about ½ inch. The latter was surrounded with a jacket chilled with liquid ammonia to −10° to −12° F. and the shaft was rotated at 132 r.p.m. The temperature of the margarine in the cylindrical heat exchanger was reduced from 52–54° F. to 36–38° F. at a throughput rate of 5240 lbs. per hour. The margarine product so obtained was smooth, stable, had excellent flavor release when tested by the taste test.

EXAMPLE 2

*Production of ice cream*

A commercial ice cream mix consisting of 62.02% water, 10.08% butter fat, 17.31% sugars, 10.09% milk solids not fat and .05% gelatin was prepared. This product was pumped from the supply tank at a rate of 2200 lbs. per hour by means of an aerating pump through a precooler where the temperature of the aerated mix was reduced to a temperature of 23–24° F. and thence into a cylindrical heat exchanger and agitator similar to that of Example 1 (and as described in my copending application Serial No. 828,414) 6 inches in diameter and 48 inches long, having a heat exchange surface of about 6 square feet. Disposed within the cylindrical heat exchanger was a cylindrical shaft 3¾ inches in diameter on an axis ¼ inch displaced from and parallel to the axis of the cylindrical heat exchanger. The shaft carried 5½ inch blades in staggered arrangement and was rotated at 95 r.p.m. The outer jacket of the cylindrical heat exchanger was chilled to −25° F. with liquid ammonia. At a rate of 2200 lbs. per hour under a pressure of 160 p.s.i.g., the ice cream was chilled to 16° F. The product emerged from the heat exchange unit in a relatively soft form but within a few seconds it sets up to an extrudable form retaining consistency. This ice cream contained about 10.08% butter fat but had the texture and taste of a product containing 16% butter fat. The ice cream contained air equal to an overrun of 100% (representing 50% air by volume).

EXAMPLE 3

*Production of peanut butter*

Roasted, cleaned and blanched peanut kernels (95% by weight) were mixed with a semi-solid fat (5% by weight), composed of peanut oil and fully hydrogenated peanut oil, and finely divided sodium chloride. The mixture was then ground in a peanut butter mill to produce a peanut butter mixture. The ground peanut butter as it emerged from the mill at a temperature of about 165° F. was passed at the rate of 2200 lbs. per hour into a heat exchanger and agitator as described in Example 1. the jacket of which was chilled with brine to about 33° F. With the shaft of the heat exchanger and agitator revolving at the rate of 285 r.p.m., the product emerged from the heat exchanger at a temperature of 87° F. The product thus obtained was very smooth and homogeneous, stable against separation and spreadable.

What is claimed as new and is desired to be secured by Letters Patent of the United States is:

1. A method of cooling, mixing and homogenizing a mixture of immiscible materials in a liquid carrier which comprises passing said mixture into an annular space defined by an outer tubular heat exchange surface and an inner shaft disposed within said tubular heat exchange surface wherein said outer surface is cooled by means of a low temperature material, applying a rotational component of movement to said material within said tubular heat exchanger, and applying a series of intermittent pressure pulsations to said material within the tubular heat exchanger whereby the material is moved in a slow spiral motion having imposed thereon a series of intermittent longitudinal backward and forward motions, passing said material longitudinally through the cylindrical heat exchange unit while it is subject to rotational and kneading action thereby to cool and homogenize the product into a stable, smooth, uniform, homogeneous material.

2. The method of claim 1 wherein the material is peanut butter and the peanut butter mixture enters the tubular heat exchanger at a temperature above 120° F. and is discharged at a temperature below 100° F.

3. The method of claim 1 wherein the material is ice cream and the ice cream mixture enters the tubular heat exchanger at a temperature above 22° F. and discharged at a temperature lower than 18° F.

4. The method of claim 1 wherein the material is margarine and the margarine mixture enters the tubular heat exchanger at a temperature above 50° F. and discharged at a temperature of about 40° F.

References Cited in the file of this patent

UNITED STATES PATENTS

| | | |
|---|---|---|
| 2,589,350 | Edmunds | Mar. 18, 1952 |
| 2,882,166 | Clarke | Apr. 14, 1959 |